United States Patent
Barone et al.

(10) Patent No.: US 11,274,743 B2
(45) Date of Patent: Mar. 15, 2022

(54) METHOD TO CONTROL THE EXECUTION OF A SHIFT TO A LOWER GEAR WHILE AN ACCELERATOR PEDAL IS RELEASED IN A DRIVETRAIN PROVIDED WITH A DUAL-CLUTCH, SERVO-ASSISTED TRANSMISSION

(71) Applicant: FERRARI S.p.A., Modena (IT)

(72) Inventors: Alessandro Barone, Bologna (IT); Andrea Nannini, Modena (IT); Giacomo Senserini, Modena (IT); Stefano Marconi, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 17/017,236

(22) Filed: Sep. 10, 2020

(65) Prior Publication Data
US 2021/0095761 A1 Apr. 1, 2021

(30) Foreign Application Priority Data
Sep. 30, 2019 (IT) .......................... 102019000017513

(51) Int. Cl.
*F16H 61/04* (2006.01)
(52) U.S. Cl.
CPC . *F16H 61/0403* (2013.01); *F16H 2061/0407* (2013.01); *F16H 2061/0418* (2013.01)
(58) Field of Classification Search
CPC ......... F16H 61/0403; F16H 2061/0407; F16H 2061/0418; F16H 61/0213; F16H 61/21;
(Continued)

(56) References Cited

U.S. PATENT DOCUMENTS

2010/0025180 A1* 2/2010 Kanno .................... F16D 21/06
                                                          192/48.609
2017/0096069 A1* 4/2017 Cho ...................... B60W 20/00

FOREIGN PATENT DOCUMENTS

DE   10160308 A1    7/2002
EP    1965102 A1 *  9/2008 ............. F16H 61/30
(Continued)

OTHER PUBLICATIONS

Search Report issued Italian Patent Application No. IT 201900017513, date of completion Mar. 26, 2020; 9 pages.

*Primary Examiner* — Justin Holmes
(74) *Attorney, Agent, or Firm* — Cantor Colburn LLP (57) ABSTRACT

A method to control the execution of a shift to a lower gear while an accelerator pedal is released in a drivetrain provided with a dual-clutch, servo-assisted transmission; the control method comprises the following steps: opening, in a first instant, an outgoing clutch; closing, in the first instant, an incoming clutch; completing the opening of the outgoing clutch and the closing of the incoming clutch in a second instant; synchronizing, between the second instant and a third instant, a rotation speed of the internal combustion engine with a rotation speed of the incoming clutch; and controlling the incoming clutch between the second instant and the third instant so as to have the incoming clutch temporarily transmit a greater torque than the torque that the clutch is going to transmit immediately after the shift to a lower gear and than the torque that the outgoing clutch transmitted immediately before the shift to a lower gear.

11 Claims, 5 Drawing Sheets

(58) Field of Classification Search
CPC ............. F16H 2061/0496; F16H 63/50; F16H 61/688; F16H 59/02; F16H 61/18; F16H 61/0204
See application file for complete search history.

(56) References Cited

FOREIGN PATENT DOCUMENTS

| | | | | |
|---|---|---|---|---|
| EP | 2290254 | A1 * | 3/2011 | ........... F16H 61/061 |
| EP | 2653755 | A1 | 10/2013 | |
| EP | 3139069 | A1 | 3/2017 | |
| EP | 3139070 | A1 | 8/2017 | |

* cited by examiner

Fig. 5

METHOD TO CONTROL THE EXECUTION OF A SHIFT TO A LOWER GEAR WHILE AN ACCELERATOR PEDAL IS RELEASED IN A DRIVETRAIN PROVIDED WITH A DUAL-CLUTCH, SERVO-ASSISTED TRANSMISSION

CROSS-REFERENCE TO RELATED APPLICATIONS

This patent application claims priority from Italian patent application no. 102019000017513 filed on Sep. 30, 2019, the entire disclosure of which is incorporated herein by reference.

TECHNICAL FIELD

The invention relates to a method to control the execution of a shift to a lower gear while an accelerator pedal is released in a drivetrain provided with a dual-clutch, servo-assisted transmission (namely, a gear shift in which the following or incoming gear is lower than the previous or outgoing gear).

PRIOR ART

A drivetrain provided with a dual-clutch, servo-assisted transmission comprises a pair of primary shafts, which are coaxial to one another, are independent of one another and are inserted inside one another; two coaxial clutches, each designed to connect a respective primary shaft to a drive shaft of an internal combustion engine; and at least one secondary shaft, which transmits the motion to the drive wheels and can be coupled to the primary shafts by means of respective gear trains, each defining a gear.

During a gear shift, the current gear couples the secondary shaft to a primary shaft, while the following gear couples the secondary shaft to the other primary shaft; as a consequence, the gear shift takes place by crossing the two clutches, namely by opening the clutch associated with the current gear and by simultaneously closing the clutch associated with the following gear.

An average driver is used to the feelings transmitted by a traditional single-clutch transmission and, therefore, expects to perceive, during a shift to a lower gear, a significant change in the longitudinal deceleration of the road vehicle (due to the new lower gear, which is supposed to increase the engine brake). However, in a standard gear shift of a dual-clutch transmission, during a shift to a lower gear there is a progressive (hence, barely perceivable) increase in the longitudinal deceleration of the road vehicle because of the progressive shortening of the gear ratio; this gear shifting mode is highly positive from the point of view of performances, but produces, in the majority of the drivers, the exact opposite impression, namely that of jeopardizing performances.

It should be pointed out that the opinion expressed by drivers must be taken into great account even when it is technically wrong, since the majority of said drivers judge the behaviour of the road vehicle based on what they perceive and believe and not based on objective criteria. In other words, the most important thing is that the vehicle is perceived as convincing by drivers (even if there is a moderate decrease in performances).

Patent applications EP2239484A1 and EP3139069A1 describe a method to control the execution of a shift to a lower gear in a drivetrain provided with a dual-clutch transmission, which improves the gear shift sensation perceived by drivers (namely, allows drivers to have good feelings when it comes to the gear shift), though without (significantly) jeopardizing performances.

Patent applications EP2653755A1 and EP3139070A1 describe a method to control the execution of a shift to a lower gear while an accelerator pedal is released in a drivetrain provided with a dual-clutch, servo-assisted transmission. The method comprises the following steps: in a first instant, opening an outgoing clutch associated with the current gear and closing an incoming clutch associated with the following gear; in a second instant, completing the opening of the outgoing clutch and completing the closing of the incoming clutch; synchronizing, between the second instant and a third instant, a rotation speed of the internal combustion engine with a rotation speed of the incoming clutch, namely with the rotation speed imposed by the gear ratio of the following gear; and controlling the incoming clutch between the second instant and the third instant so as to have the incoming clutch temporarily transmit a greater torque than the braking torque of the internal combustion engine in order to accelerate the internal combustion engine using the kinetic energy owned by the road vehicle. The internal combustion engine is activated in the second time instant (namely, at the very beginning of the synchronization time) and is deactivated in the third time instant (namely, at the very end of the synchronization time) so as to generate a torque that helps increase the rotation speed of the internal combustion engine; in this way, during the entire synchronization time (namely, from the second time instant to the third time instant), the internal combustion engine generates a torque.

DESCRIPTION OF THE INVENTION

The object of the invention is to provide a method to control the execution of a shift to a lower gear while an accelerator pedal is released in a drivetrain provided with a dual-clutch, servo-assisted transmission, said method not suffering from the drawbacks discussed above and, at the same time, being easy and economic to be implemented.

According to the invention there is provided a method to control the execution of a shift to a lower gear while an accelerator pedal is released in a drivetrain provided with a dual-clutch, servo-assisted transmission, according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PRIOR ART

PREFERRED EMBODIMENTS OF THE INVENTION

Figure 1:
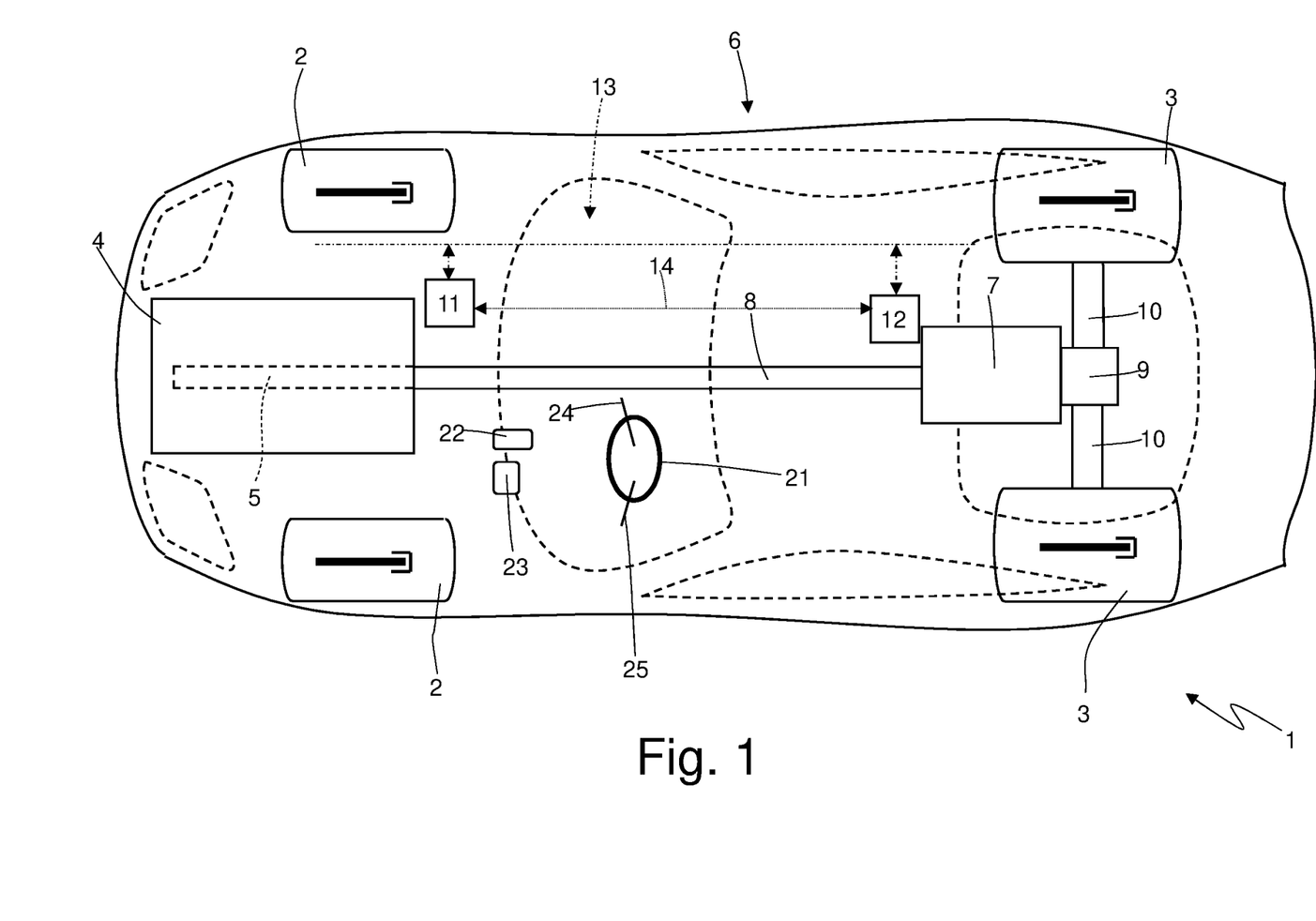
FIG. 1 is a schematic plan view of a rear-wheel drive road vehicle provided with a drivetrain with a dual-clutch, servo-assisted transmission, which is controlled according to the control method of the invention.

In FIG. 1, number 1 indicates, as a whole, a road vehicle (in particular, a car) provided with two front driven (namely, non-drive) wheels 2 and with two rear drive wheels 3. In a front position there is an internal combustion engine 4, which is provided with a drive shaft 5, which produces a torque $T_E$, which is transmitted to the drive wheels 3 by means of a drivetrain 6. The drivetrain 6 comprises a dual-clutch, servo-assisted transmission 7 arranged in the rear-wheel-drive assembly and a transmission shaft 8, which connects the drive shaft 5 to an input of the dual-clutch, servo-assisted transmission 7. The dual-clutch, servo-assisted transmission 7 is connected, in a train-like manner, to a self-locking differential 9, from which a pair of axle shafts 10 start, each integral to a drive wheel 3.

The road vehicle 1 comprises a control unit 11 of the internal combustion engine 4, which controls the internal combustion engine 4, a control unit 12 of the drivetrain 6, which controls the drivetrain 6, and a BUS line 13, which is manufactured, for example, according to the CAN (Car Area Network) protocol, extends to the entire road vehicle 1 and allows the two control units 11 and 12 to communicate with one another. In other words, the control unit 11 of the internal combustion engine 4 and the control unit 12 of the drivetrain 6 are connected to the BUS line 13 and, therefore, can communicate with one another by means of messages sent through the BUS line 13. Furthermore, the control unit 11 of the internal combustion engine 4 and the control unit 12 of the drivetrain 6 can be directly connected to one another by means of a dedicated synchronization cable 14, which is capable of directly transmitting a signal from the control unit 12 of the drivetrain 6 to the control unit 11 of the internal combustion engine 4 without the delays caused by the BUS line 13. Alternatively, the synchronization cable 14 could be absent and all communications between the two control units 11 and 12 could be exchanged using the BUS line 13.

Figure 2:
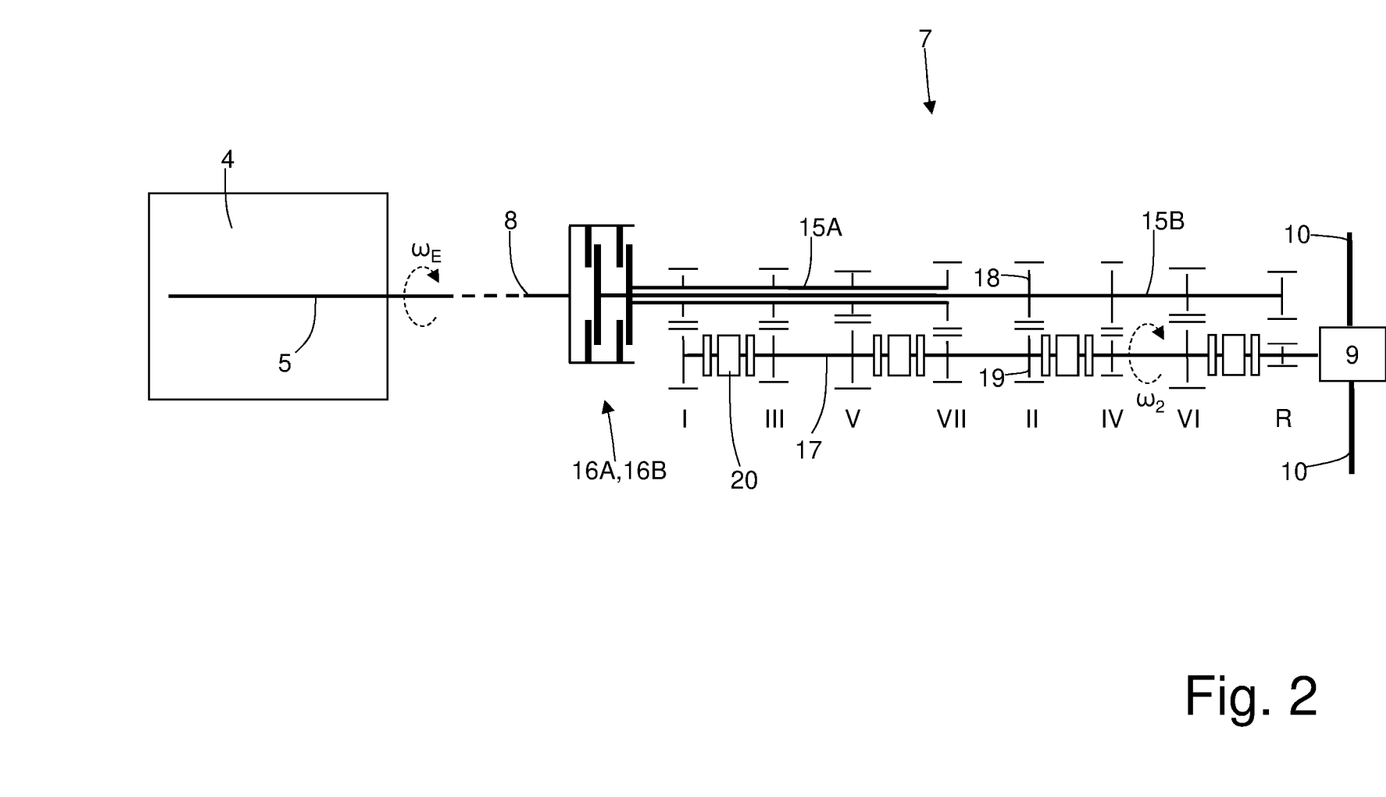
FIG. 2 is a schematic view of the drivetrain of FIG. 1.

According to FIG. 2, the dual-clutch, servo-assisted transmission 7 comprises a pair of primary shafts 15, which are coaxial to one another, independent of one another and inserted inside one another. Furthermore, the dual-clutch, servo-assisted transmission 7 comprises two coaxial clutches 16, each designed to connect a respective primary shaft 15 to the drive shaft 5 of the internal combustion engine 4 through the interposition of the transmission shaft 8; each clutch 16 is an oil bath clutch and, hence, is pressure-controlled (i.e. the degree of opening/closing of the clutch 16 is determined by the pressure of the oil inside the clutch 16); according to an alternative embodiment, each clutch 16 is a dry clutch and, hence, is position-controlled (i.e. the degree of opening/closing of the clutch 16 is determined by the position of a movable element of the clutch 16). The dual-clutch, servo-assisted transmission 7 comprises one single secondary shaft 17 connected to the differential 9 that transmits the motion to the drive wheels 3; according to an alternative and equivalent embodiment, the dual-clutch, servo-assisted transmission 7 comprises two secondary shafts 17, both connected to the differential 9.

The dual-clutch, servo-assisted transmission 7 has seven forward gears indicated with Roman numerals (first gear I, second gear II, third gear III, fourth gear IV, fifth gear V, sixth gear VI and seventh gear VII) and a reverse gear (indicated with R). The primary shaft 15 and the secondary shaft 17 are mechanically coupled to one another by a plurality of gear trains, each defining a respective gear and comprising a primary gear wheel 18 fitted on the primary shaft 15 and a secondary gear wheel 19 fitted on the secondary shaft 17. In order to allow for a correct operation of the dual-clutch, servo-assisted transmission 7, all odd gears (first gear I, third gear III, fifth gear V, seventh gear VII) are coupled to a same primary shaft 15, whereas all even gears (second gear II, fourth gear IV and sixth gear VI) are coupled to the other primary shaft 15.

Each primary gear wheel 18 is splined to a respective primary shaft 15, so as to always rotate with the primary shaft 15 in an integral manner, and permanently meshes with the respective secondary gear wheel 19; on the other hand, each secondary gear wheel 19 is mounted on the secondary shaft 17 in an idle manner. Furthermore, the dual-clutch, servo-assisted transmission 7 comprises four synchronizers 20, each mounted coaxial to the secondary shaft 17, arranged between two secondary gear wheels 19 and designed to be operated so as to alternatively fit the two respective secondary gear wheels 19 to the secondary shaft 17 (i.e. so as to alternatively cause the two respective secondary gear wheels 19 to become angularly integral to the secondary shaft 17). In other words, each synchronizer 20 can be moved in one direction to fit a secondary gear wheel 19 to the secondary shaft 17 or can be moved in the other direction to fit the other secondary gear wheel 19 to the secondary shaft 17.

The dual-clutch transmission 7 comprises one single secondary shaft 17 connected to the differential 9 that transmits the motion to the drive wheels 3; according to an alternative and equivalent embodiment, the dual-clutch transmission 7 comprises two secondary shafts 17, both connected to the differential 9.

According to FIG. 1, the road vehicle 1 comprises a passenger compartment housing a driving position for the driver; the driving position comprises a seat (which is not shown), a steering wheel 21, an accelerator pedal 22, a brake pedal 23 and two paddle shifters 24 and 25, which control the dual-clutch, servo-assisted transmission 7 and are connected to the opposite sides of the steering wheel 21. The upshift paddle shifter 24 is operated by the driver (by means of a short pressure) in order to request an upshift (namely, the engagement of a new gear, which is higher than the current gear and contiguous with the current gear), whereas the downshift paddle shifter 25 is operated by the driver (by means of short pressure) in order to request a downshift (namely, the engagement of a new gear, which is lower than the current gear and is contiguous with the current gear).

Hereinafter there is a description of the modes of execution of a downshift, while the accelerator pedal 22 is released (namely, while the internal combustion engine 4 is in cut-off condition and generates a braking torque $T_E$ operating in engine brake mode), from a current, higher gear A to a following, lower gear B; namely, the current gear A has a greater gear ratio than the following gear B (hence, given the same speed of the road vehicle 1, the current gear A causes the internal combustion engine 4 to run more slowly than the following gear B).

In an initial situation (i.e. before the gear shift), an outgoing clutch 16B is closed in order to transmit the motion to a primary shaft 15A, which, in turn, transmits the motion to the secondary shaft 17 through the current gear A, which is engaged; an incoming clutch 16B, on the other hand, is open and, hence isolates a primary shaft 15B from the transmission shaft 8. Before beginning the upshift, the following gear B is engaged in order to connect, through the gear B, the primary shaft 15B to the secondary shaft 17. When the driver sends the gear shift command, the gear shift is carried out by opening the clutch 16A in order to disconnect the primary shaft 15A (hence, the gear A) from the transmission shaft 8 (i.e. from the drive shaft 5 of the internal combustion engine 4) and, simultaneously, by closing the incoming clutch 16B in order to connect the primary shaft 15B (hence, the gear B) to the transmission shaft 8 (i.e. to the drive shaft 5 of the internal combustion engine 4).

Figure 3:
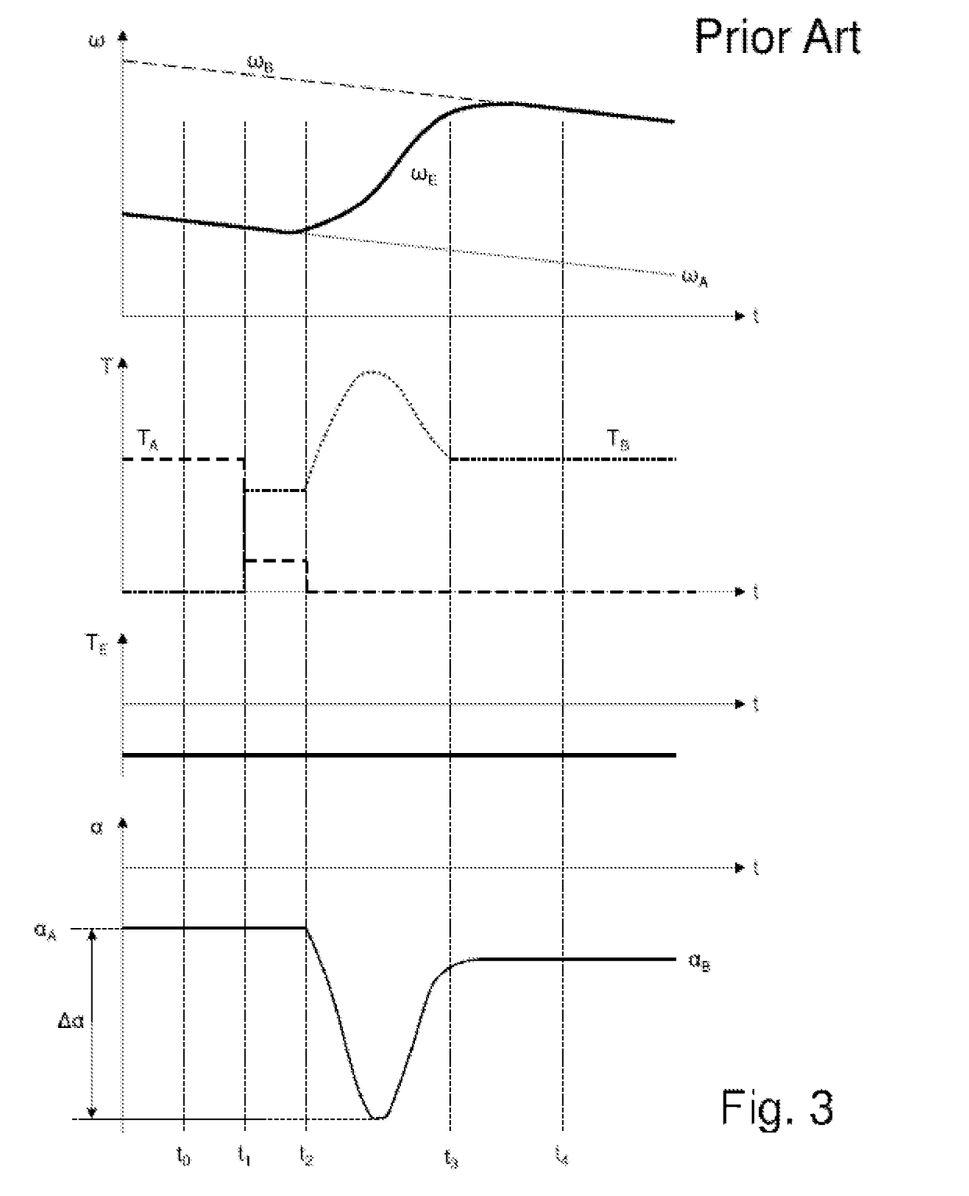
FIG. 3 shows the time development of the torques transmitted by the two clutches of the dual-clutch transmission, of the rotation speed of a drive shaft of the internal combustion engine, of the longitudinal deceleration of the road vehicle and of the torque generated by the internal combustion engine during a known shift to a lower gear.

FIG. 3 shows the ways in which a known shift to a lower gear is carried out, the driver sending the downshift command by acting upon the downshift paddle shifter 25. FIG. 3 shows, starting from the top:

a first diagram showing the time development of the rotation speed $\omega_E$ of the internal combustion engine 4, the rotation speed $\omega_A$ of the outgoing clutch 16A and the rotation speed $\omega_B$ of the incoming clutch 16B;

a second diagram showing the time development of the torques $T_A$ and $T_B$ transmitted by the two clutches 16A and 16B;

a third diagram showing the time development of the torque $T_E$ generated by the internal combustion engine 4 (the internal combustion engine 4 is in cut-off condition and, hence, operates in engine braking mode generating a negative torque $T_E$); and a fourth diagram showing the time development of the longitudinal acceleration α of the vehicle 1 (it should be pointed out that the longitudinal acceleration α of the vehicle 1 always is negative, namely the vehicle 1 is slowing down as the internal combustion engine 4 is generating a negative torque $T_E$, namely is braking, thus operating in engine braking mode).

As soon as the control unit 12 of the drivetrain 6 receives the gear shift command from the driver (instant t0), the control unit 12 of the drivetrain immediately starts filling the incoming clutch 16B, namely it immediately starts feeding oil under pressure into the incoming clutch 16B; indeed, the incoming clutch 16B associated with the following gear B can transmit a significant torque to the rear drive wheels 3 only when the filling with oil under pressure has been completed and, hence, the oil under pressure, for it cannot occupy further volume inside the incoming clutch 16B, exerts a thrust that packs the discs of the incoming clutch 16B. As a consequence, before the incoming clutch 16B associated with the following gear B can actually start transmitting a significant torque to the rear drive wheels 3, it is necessary to wait for a given delay time interval (typically ranging from 80 to 220 thousandths of second), during which the filling of the incoming clutch 16B with oil is completed. The completion of the filling of the incoming clutch 16B is normally monitored through a pressure sensor, which detects the pressure of the oil inside the incoming clutch 16B: when the pressure of the oil inside the incoming clutch 16B exceeds a predetermined threshold, this means that the inner volume of the incoming clutch 16B was completely filled and, hence, the oil inside the clutch 16B starts compressing. As a consequence, the instant $t_1$ in which (after the delay time has elapsed) the incoming clutch 16B is filled with oil and is ready to transit a significant torque is established when the pressure of the oil inside the incoming clutch 16B exceeds the predetermined threshold.

From the instant to, in which the control unit 12 of the drivetrain immediately starts closing the incoming clutch 16B, to the instant $t_1$, in which, after the delay time has elapsed, the incoming clutch 16B is filled with oil and is ready to transmit a significant torque, nothing happens to the dynamic of the road vehicle 1, i.e. the entire torque $T_E$ generated by the internal combustion engine 4 (which is a negative torque $T_E$, namely a braking torque $T_E$, since the internal combustion engine 4 is in cut-off condition and, hence, operates as engine brake) is entirely transmitted by the clutch 16A, like before the beginning of the gear shift. In the instant $t_1$, the incoming clutch 16B starts transmitting a torque $T_B$ (namely, the torque $T_B$ starts increasing) and, at the same time, the clutch 16A is ordered to open (namely, the torque $T_A$ starts decreasing); it should be pointed out that the opening of the clutch 16A associated with the current gear A takes place with no delay as the clutch 16A is already filled with oil under pressure and, in this phase, it simply needs to be emptied from part of the oil by opening a solenoid valve (whose action, thus, is instantaneous).

Between the instants $t_1$ and $t_2$ there is a transfer of torque between the two clutches 16A and 16B, i.e. the torque transmitted by the clutch decreases (more or less progressively) and, at the same time, the torque transmitted by the incoming clutch 16B increases (more or less progressively), thus determining a crossing between the two clutches 16A and 16B. In the instant $t_2$, the clutch 16A is completely open (hence, it does not transmit any torque any longer), whereas the incoming clutch 16B transmits the entire torque $T_E$ of the internal combustion engine 4. Between the instants $t_1$ and $t_2$ there is the shifting time, during which the torque transmitted by the clutch 16A decreases until it becomes zero and, simultaneously, the torque transmitted by the incoming clutch 16B increases until it reaches the torque $T_E$ generated by the internal combustion engine 4 (as already mentioned above, the internal combustion engine 4 is in cut-off condition and, hence, operates as engine brake, thus generating a negative torque $T_E$), namely during which the clutch 16A separates itself from the drive wheels 3 and the incoming clutch 16B gets connected to the drive wheels 3.

The rotation speed $\omega_E$ of the internal combustion engine 4 is equal to the rotation speed $\omega_A$ imposed by the gear ratio of the current gear A before the gear shift until the instant $t_2$, it progressively increases towards the rotation speed $\omega_B$ imposed by the gear ratio of the following gear during the gear shift and is equal to the rotation speed $\omega_B$ after the gear shift. According to FIG. 3, until the instant $t_2$ the clutch 16A is not completely open yet and, therefore, the rotation speed $\omega_E$ of the internal combustion engine 4 is equal (corresponds) to the rotation speed $\omega_A$ imposed by the gear ratio of the current gear A associated with the clutch 16A; as a consequence, the rotation speed $\omega_E$ of the internal combustion engine 4 is increased only after the clutch 16A has been completely opened.

Between the instants $t_2$ and $t_3$ there is the synchronization time, during which the rotation speed $\omega_E$ of the internal combustion engine 4 increases from the rotation speed $\omega_A$ imposed by the gear ratio of the current gear A to the rotation speed $\omega_B$ imposed by the gear ratio of the following gear B, namely the rotation speed $\omega_E$ is synchronized with the rotation speed $\omega_B$.

In order to increase the rotation speed $\omega_E$ of the internal combustion engine 4 after the complete opening of the clutch 16A, the sole kinetic energy owned by the road vehicle 1 is used (namely, the internal combustion engine 4 is never turned on and always operates only as engine brake); in order to reduce the time needed to synchronize the rotation speed $\omega_E$ of the internal combustion engine 4 with the rotation speed $\omega_B$ of the incoming clutch 16B, between the instants $t_2$ and $t_3$ the incoming clutch 16B is overclosed, thus increasing the pressure of the oil so as to transfer a greater torque to the drive wheels 3. Then, the incoming clutch 16B is controlled so as to temporarily transmit a greater torque $T_B$ than the torque $T_B$ that the clutch 16B is going to transmit immediately after the gear shift and than the torque $T_A$ that the outgoing clutch 16A transmitted immediately before the gear shift. In other words, in order to synchronize the rotation speed $\omega_E$ of the internal combustion engine 4 with the rotation speed $\omega_B$ of the incoming clutch 16B, it is not the torque $T_E$ generated by the internal combustion engine 4 that is temporarily increased, but it is the torque $T_B$ transmitted by the incoming clutch 16B that is temporarily increased so as to more quickly transfer the kinetic energy from the road vehicle 1 to the internal combustion engine 4. Namely, the incoming clutch 16B is controlled so as to transmit to the rear drive wheels 3 a (negative) torque that is greater (in absolute value) than the (negative) torque $T_E$ generated by the internal combustion engine 4 so as to progressively increase the rotation speed $\omega_E$ of the internal combustion engine 4 from the initial value $\omega_A$ to the final value $\omega_B$; in this situation, the incoming clutch 16B is controlled so as to transmit to the rear wheels 3 both the (negative) torque $T_E$ generated by the internal combustion engine 4 and a further (extra) (negative) torque generated by the increase in the kinetic energy owned by the drive shaft 5 (i.e. generated by the acceleration of the drive shaft 5).

The longitudinal acceleration α of the vehicle 1 is approximately constant and equal to the value $\alpha_A$ (which is negative, since the vehicle is slowing down) immediately before the gear shift and is approximately constant and equal to the value $\alpha_B$ (which is negative, since the vehicle is slowing down, and greater than the value $\alpha_A$ in absolute value) immediately after the gear shift. The increase (in absolute value) in the longitudinal acceleration α of the vehicle 1 during the gear shift is due to the fact that the (negative, namely braking) torque $T_E$ generated by the internal combustion engine 4, which remains constant, is transmitted with a decreasing gear ratio (the gear A is higher than the gear B) and, therefore, an increasing braking torque is applied to the rear drive wheels 3.

According to FIG. 3, the above-mentioned solution of temporarily overclosing the incoming clutch 16B creates a deceleration peak (namely, a sudden decrease in the longitudinal acceleration α of the vehicle 1) between the instants $t_2$ and $t_3$; this deceleration peak determines a deceleration jump Δα that is particularly relevant and quick and gives the driver a sports driving sensation, even though the driving comfort worsens. Indeed, the increase (in absolute value) and the subsequent decrease (in absolute value) in the longitudinal deceleration α within a small amount of time (approximately 80-150 milliseconds) between the instants $t_2$ and $t_3$ determines an oscillatory movement of the head of the passengers of the vehicle around the "hinge" of the neck; the forward movement (when the negative longitudinal acceleration α increases in absolute value) and backward (when the negative longitudinal acceleration α decreases in absolute value) of the head of the passengers of the vehicle is perceived as uncomfortable if it does not take place when sports driving mode is being used. As a consequence, the aforesaid solution of temporarily overclosing the incoming clutch 16B is used only when, while driving in sports mode, a "driving pleasure" (namely, a high "sports driving" sensation) has to be reached, even at the expense of comfort.

As already mentioned above, the incoming clutch 16B is controlled so as to be temporarily overclosed and, hence, transmit a greater torque $T_B$ than the torque $T_B$ that the clutch 16B is going to transmit immediately after the gear shift and than the torque $T_A$ that the outgoing clutch 16A transmitted immediately before the gear shift; in this way, the torque needed to cause the drive shaft 5 to accelerate is "drawn" from the motion of the road vehicle 1 and the internal combustion engine 4 does not need to be turned on during the synchronization time (namely, between the instants $t_2$ and $t_3$). This strategy is particularly efficient from an energy point of view, because it does require not the generation of a positive torque $T_E$ by the internal combustion engine 4 and, therefore, does not involve a fuel consumption during the gear shift. However, on the other hand, this strategy (aimed at carrying out a downshift in short times, namely at containing the synchronization time comprised between the instants $t_2$ e $t_3$) entails applying to the drive wheels 3 a particularly high impulsive braking torque, which, under unfavourable conditions (namely, when the road surface has a small grip), could cause a temporary block of the drive wheels 3, which surely is negative from the point of view of the sensations transmitted to the driver (the block of the drive wheel 3 always is an "error", since an ideal driving always entails never blocking the wheels), from the point of view of tyre wear and from the point of view of safety (when the wheels block, they lose in directionality).

Figure 4:
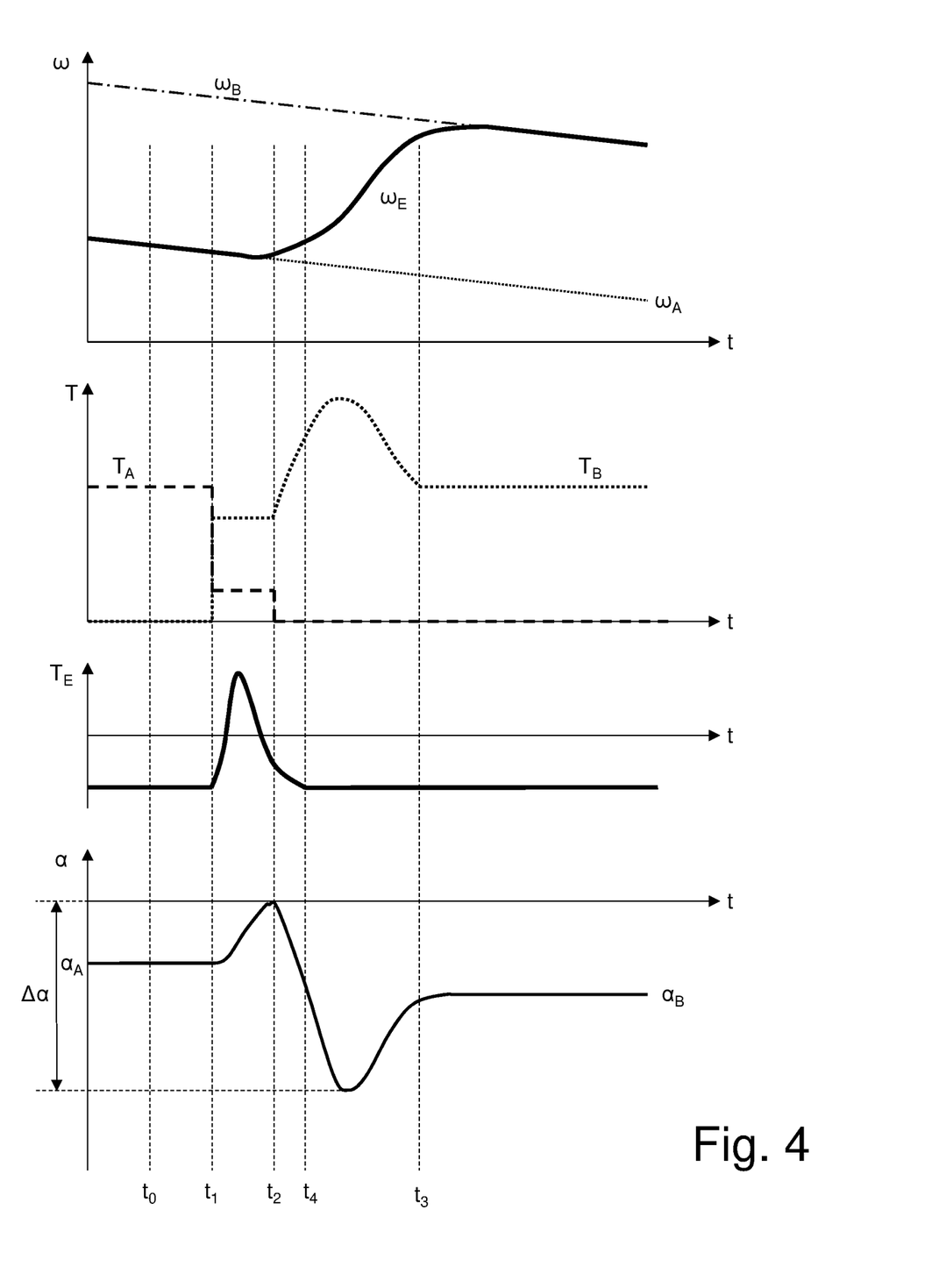
FIG. 4 and FIG. 5 show[s] the time development of the torques transmitted by the two clutches of the dual-clutch transmission, of the rotation speed of a drive shaft of the internal combustion engine, of the longitudinal deceleration of the road vehicle and of the torque generated by the internal combustion engine during a shift to a lower gear carried out with the method according to the invention.
Figure 5:
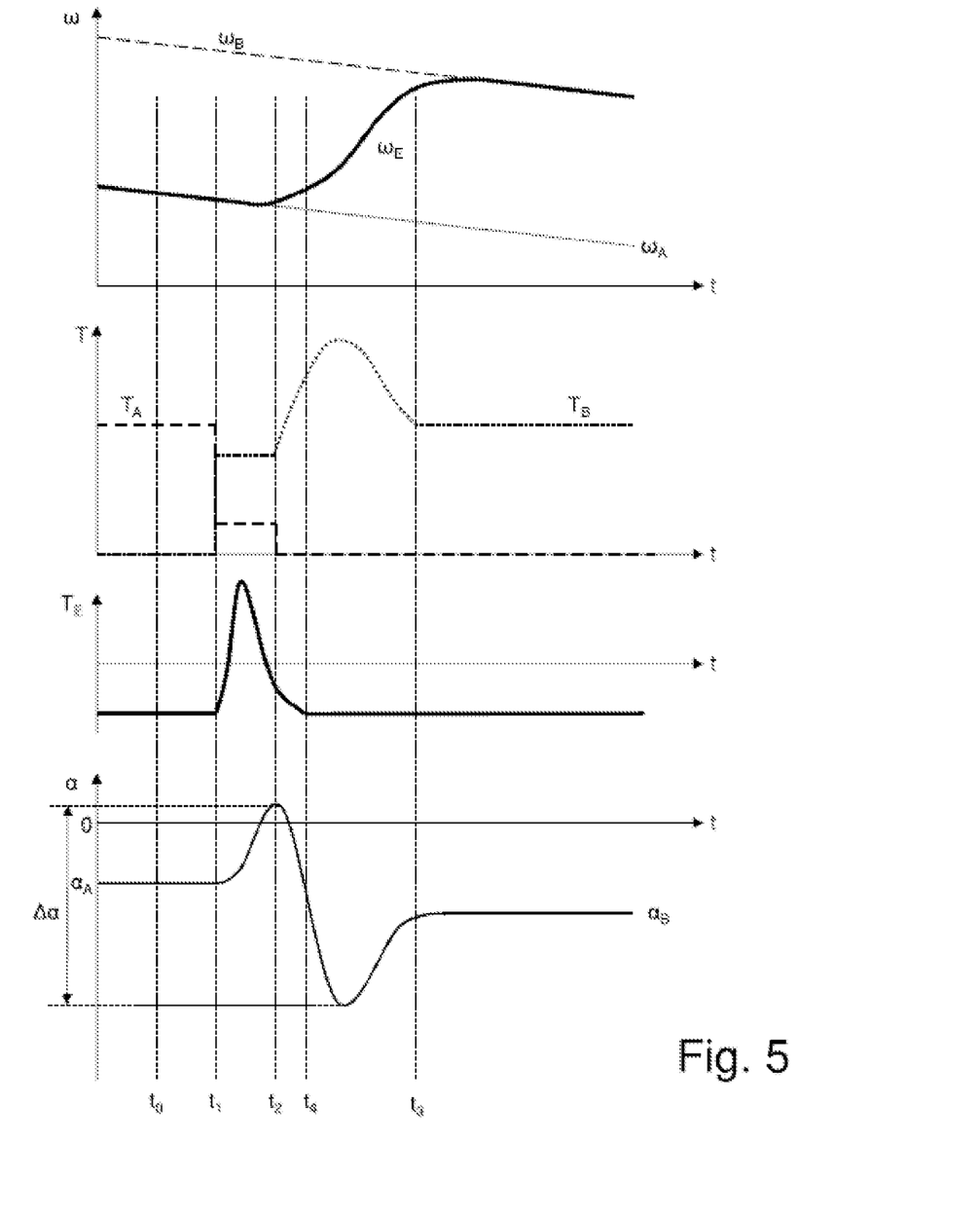

In order to avoid running the risk of blocking the drive wheels 3 during a downshift, according to FIG. 4 and FIG. 5 it is possible to operate in a slightly different manner: before the synchronization time (comprised between the instants $t_2$ and $t_3$), the internal combustion engine 4 is temporarily turned on so as to increase the torque $T_E$ generated by the internal combustion engine 4 and, hence, help synchronize the rotation speed $\omega_E$ of the internal combustion engine 4 with the rotation speed $\omega_B$ imposed by the gear ratio of the following gear. In particular, the internal combustion engine 4 is turned on so as to increase the torque $T_E$ generated by the internal combustion engine 4 between the instant $t_1$ (in which the incoming clutch 16B starts closing and the clutch 16A starts opening) and an instant $t_4$ prior to the instant $t_3$, in which the synchronization of the rotation speeds $\omega_E$ and $\omega_B$ is completed and the overclosing of the incoming clutch 16B ends. In this way, between the instants $t_1$ and $t_2$, the longitudinal acceleration α of the vehicle 1 increases (reaching zero or even slightly positive values) before having a subsequent deceleration peak (namely, a sudden decrease in the longitudinal deceleration α of the vehicle 1) between the instants $t_2$ and $t_3$; this deceleration peak determines a deceleration jump Δα that is particularly relevant and quick and substantially has the same extent as the deceleration jump Δα obtained using the control mode shown in FIG. 3. However, using the control mode shown in FIG. 4 and FIG. 5, the deceleration jump Δα, despite featuring the same extent as the deceleration jump obtained using the control mode shown in FIG. 3, does not reach, in absolute value, very high deceleration values and, therefore, does not risk temporarily blocking the drive wheels 3. Indeed, using the control mode shown in FIG. 4 and FIG. 5, the deceleration jump starts from higher initial values (obtained by turning on the internal combustion engine 4 between the instants $t_1$ and $t_4$) and then reaches higher final values (i.e. smaller decelerations).

During the downshift, the internal combustion engine 4 is activated so as to generate a torque $T_E$ between the instant $t_2$ and the instant $t_4$, which always is prior to the instant $t_3$. In the embodiment shown in FIG. 4 and FIG. 5, the instant $t_4$ is comprised between the instant $t_2$ and the instant $t_3$, namely the instant $t_4$ is subsequent to the instant $t_2$ and prior to the instant $t_3$; in particular, the instant $t_4$ is closer (nearer) to the instant $t_2$ and farther from the instant $t_3$ (i.e. the time interval elapsing between the instants $t_2$ and $t_4$ is shorter than the time interval elapsing between $t_4$ and $t_3$). According to a different embodiment which is not shown herein, the instant $t_4$ is prior to the instant $t_2$, namely the internal combustion engine 4 is turned off before the instant $t_2$.

In other words, in some moments, the sensations expected by the driver are highly sports-like, which generally translates into quick acceleration and sound changes; beside the desire to reach these sensations, there also is the need for a quicker response of the road vehicle 1 in terms of short shifting times. In case of a downshift, these demands can be fulfilled through the application of an extra torque $T_B$ onto the incoming clutch 16B which is about to close, so as to accelerate the internal combustion engine 4 through the kinetic energy of the road vehicle 1; by so doing, it is possible to obtain a deceleration peak (namely, the deceleration is subjected to a quick increase followed by a quick decrease), thus offering the driver an extremely sports-like sensation. However, the desire for a sports-like and highly performing downshift cannot disregard the need for safety; therefore, in order to avoid risking blocking the drive wheels 3 during the downshift, the internal combustion engine 4 is temporarily turned on during the torque exchange phase, so as to reach the same deceleration jump $\Delta\alpha$, though without reaching "dangerous" (i.e. too high) deceleration values (by the way, the restarting of the internal combustion engine 4 produces a pleasant sound during the downshift). Therefore, by temporarily turning on the internal combustion engine 4 during the torque exchange phase it is possible to ensure a sports shifting feeling, though without subjecting the drive wheels 3 to blocking phenomena, which, besides being annoying, can also be very dangerous.

The embodiments described herein can be combined with one another, without for this reason going beyond the scope of protection of the invention.

The control method described above has different advantages.

First of all, the control method to carry out a shift to a lower gear described above offers the driver a sensation of high performances ("sportiveness") combined with a "pleasant" sound of the internal combustion engine 4 (due to the restarting of the internal combustion engine 4 during the downshift), which is also highly appreciated by drivers.

Furthermore, the control method described above is easy and economic to be implemented, since it does not require the installation of additional physical components and does not call for an expansion of the control unit 12 of the drivetrain 6, since no additional calculation ability is needed.

LIST OF THE REFERENCE NUMBERS OF THE FIGURES 1 road vehicle
2 front wheels
3 rear wheels
4 engine
5 drive shaft
6 drivetrain
7 transmission
8 transmission shaft
9 differential
10 axle shafts
11 engine control unit
12 drivetrain control unit
13 BUS line
14 synchronization cable
15 primary shafts
16 clutches
17 secondary shaft
18 primary gear wheel
19 secondary gear wheel
20 synchronizers
21 steering wheel
22 accelerator pedal
23 brake pedal
24 upshift paddle shifter
25 downshift paddle shifter
$\omega_E$ rotation speed
$\omega_A$ rotation speed
$\omega_B$ rotation speed
$T_E$ torque
$T_A$ torque
$T_B$ torque
$\alpha$ acceleration
$t_0$ time instant
$t_1$ time instant
$t_2$ time instant
$t_3$ time instant
$t_4$ time instant

The invention claimed is:

1. A method to control the execution of a shift to a lower gear while an accelerator pedal (22) is released in a drivetrain (6) provided with a dual-clutch, servo-assisted transmission (7), so as to shift from a current gear (A) to a following gear (B), which is shorter than the current gear (A);

the drivetrain (6) comprises a dual-clutch, servo-assisted transmission (7) having two primary shafts (15); at least one secondary shaft (17) connected to drive wheels (3); and two clutches (16A, 16B), each interposed between a drive shaft (5) of an internal combustion engine (4) and a corresponding primary shaft (15);

the control method comprises the steps of:

opening, in a first instant ($t_1$), an outgoing clutch (16A) associated with the current gear (A);

closing, in the first instant ($t_1$), an incoming clutch (16B) associated with the following gear (B);

completing the opening of the outgoing clutch (16A) in a second instant ($t_2$);

completing the closing of the incoming clutch (16A) in the second instant ($t_2$);

synchronizing, between the second instant ($t_2$) and a third instant ($t_3$), a rotation speed ($\omega_E$) of the internal combustion engine (4) with a rotation speed ($\omega_B$) of the incoming clutch (16B), namely with the rotation speed ($\omega_B$) imposed by the gear ratio of the following gear (B);

controlling the incoming clutch (16B) between the second instant ($t_2$) and the third instant ($t_3$) so as to have the incoming clutch (16B) temporarily transmit a greater torque ($T_B$) than the torque that the clutch (16B) is going to transmit immediately after the shift to a lower gear and than the torque ($T_A$) that the outgoing clutch (16A) transmitted immediately before the shift to a lower gear in order to accelerate the internal combustion engine (4) using the kinetic energy owned by a road vehicle (1) provided with the drivetrain (6); and activating the internal combustion engine (4) so as to generate a torque ($T_E$) between the first instant ($t_1$) and a fourth instant ($t_4$), which is prior to the third instant ($t_3$);
wherein a longitudinal deceleration ($\alpha$) of the road vehicle (1) at first increases and then decreases between the first instant ($t_1$) and the third instant ($t_3$).

2. The control method according to claim 1, wherein the fourth instant ($t_4$) is comprised between the second instant ($t_2$) and the third instant ($t_3$), namely the fourth instant ($t_4$) is subsequent to the second instant ($t_2$) and prior to the third instant ($t_3$).

3. The control method according to claim 2, wherein the fourth instant ($t_4$) is closer to the second instant ($t_2$) and farther from the third instant ($t_3$).

4. The control method according to claim 1, wherein the fourth instant ($t_4$) is prior to the second instant ($t_2$).

5. The control method according to claim 1, wherein a longitudinal deceleration ($\alpha$) of the road vehicle (1) decreases after the second instant ($t_2$).

6. The control method according to claim 1, wherein the longitudinal deceleration ($\alpha$) of the road vehicle (1) is zero in the second instant ($t_2$).

7. The control method according to claim 1, wherein in the second instant ($t_2$) the road vehicle (1) has a positive longitudinal acceleration ($\alpha$).

8. A method to control the execution of a shift to a lower gear while an accelerator pedal (22) is released in a drivetrain (6) provided with a dual-clutch, servo-assisted transmission (7), so as to shift from a current gear (A) to a following gear (B), which is shorter than the current gear (A);
the drivetrain (6) comprises a dual-clutch, servo-assisted transmission (7) having two primary shafts (15); at least one secondary shaft (17) connected to drive wheels (3); and two clutches (16A, 16B), each interposed between a drive shaft (5) of an internal combustion engine (4) and a corresponding primary shaft (15);
the control method comprises the steps of:
opening, in a first instant ($t_1$), an outgoing clutch (16A) associated with the current gear (A);
closing, in the first instant ($t_1$), an incoming clutch (16B) associated with the following gear (B);
completing the opening of the outgoing clutch (16A) in a second instant ($t_2$);
completing the closing of the incoming clutch (16A) in the second instant ($t_2$);
synchronizing, between the second instant ($t_2$) and a third instant ($t_3$), a rotation speed ($\omega_E$) of the internal combustion engine (4) with a rotation speed ($\omega_B$) of the incoming clutch (16B), namely with the rotation speed ($\omega_B$) imposed by the gear ratio of the following gear (B);
controlling the incoming clutch (16B) between the second instant ($t_2$) and the third instant ($t_3$) so as to have the incoming clutch (16B) temporarily transmit a greater torque ($T_B$) than the torque that the clutch (16B) is going to transmit immediately after the shift to a lower gear and than the torque ($T_A$) that the outgoing clutch (16A) transmitted immediately before the shift to a lower gear in order to accelerate the internal combustion engine (4) using the kinetic energy owned by a road vehicle (1) provided with the drivetrain (6); and
activating the internal combustion engine (4) so as to generate a torque ($T_E$) between the first instant ($t_1$) and a fourth instant ($t_4$), which is prior to the third instant ($t_3$);
wherein the fourth instant ($t_4$) is comprised between the second instant ($t_2$) and the third instant ($t_3$), namely the fourth instant ($t_4$) is subsequent to the second instant ($t_2$) and prior to the third instant ($t_3$); and
wherein the fourth instant ($t_4$) is closer to the second instant ($t_2$) and farther from the third instant ($t_3$).

9. A method to control the execution of a shift to a lower gear while an accelerator pedal (22) is released in a drivetrain (6) provided with a dual-clutch, servo-assisted transmission (7), so as to shift from a current gear (A) to a following gear (B), which is shorter than the current gear (A);
the drivetrain (6) comprises a dual-clutch, servo-assisted transmission (7) having two primary shafts (15); at least one secondary shaft (17) connected to drive wheels (3); and two clutches (16A, 16B), each interposed between a drive shaft (5) of an internal combustion engine (4) and a corresponding primary shaft (15);
the control method comprises the steps of:
opening, in a first instant ($t_1$), an outgoing clutch (16A) associated with the current gear (A);
closing, in the first instant ($t_1$), an incoming clutch (16B) associated with the following gear (B);
completing the opening of the outgoing clutch (16A) in a second instant ($t_2$);
completing the closing of the incoming clutch (16A) in the second instant ($t_2$);
synchronizing, between the second instant ($t_2$) and a third instant ($t_3$), a rotation speed ($\omega_E$) of the internal combustion engine (4) with a rotation speed ($\omega_B$) of the incoming clutch (16B), namely with the rotation speed ($\omega_B$) imposed by the gear ratio of the following gear (B);
controlling the incoming clutch (16B) between the second instant ($t_2$) and the third instant ($t_3$) so as to have the incoming clutch (16B) temporarily transmit a greater torque ($T_B$) than the torque that the clutch (16B) is going to transmit immediately after the shift to a lower gear and than the torque ($T_A$) that the outgoing clutch (16A) transmitted immediately before the shift to a lower gear in order to accelerate the internal combustion engine (4) using the kinetic energy owned by a road vehicle (1) provided with the drivetrain (6); and
activating the internal combustion engine (4) so as to generate a torque ($T_E$) between the first instant ($t_1$) and a fourth instant ($t_4$), which is prior to the third instant ($t_3$);
wherein the fourth instant ($t_4$) is prior to the second instant ($t_2$).

10. A method to control the execution of a shift to a lower gear while an accelerator pedal (22) is released in a drivetrain (6) provided with a dual-clutch, servo-assisted transmission (7), so as to shift from a current gear (A) to a following gear (B), which is shorter than the current gear (A);
the drivetrain (6) comprises a dual-clutch, servo-assisted transmission (7) having two primary shafts (15); at least one secondary shaft (17) connected to drive wheels (3); and two clutches (16A, 16B), each interposed between a drive shaft (5) of an internal combustion engine (4) and a corresponding primary shaft (15);
the control method comprises the steps of:
opening, in a first instant ($t_1$), an outgoing clutch (16A) associated with the current gear (A);
closing, in the first instant ($t_1$), an incoming clutch (16B) associated with the following gear (B);

completing the opening of the outgoing clutch (16A) in a second instant ($t_2$);

completing the closing of the incoming clutch (16A) in the second instant ($t_2$);

synchronizing, between the second instant ($t_2$) and a third instant ($t_3$), a rotation speed ($\omega_E$) of the internal combustion engine (4) with a rotation speed ($\omega_B$) of the incoming clutch (16B), namely with the rotation speed ($\omega_B$) imposed by the gear ratio of the following gear (B);

controlling the incoming clutch (16B) between the second instant ($t_2$) and the third instant ($t_3$) so as to have the incoming clutch (16B) temporarily transmit a greater torque ($T_B$) than the torque that the clutch (16B) is going to transmit immediately after the shift to a lower gear and than the torque ($T_A$) that the outgoing clutch (16A) transmitted immediately before the shift to a lower gear in order to accelerate the internal combustion engine (4) using the kinetic energy owned by a road vehicle (1) provided with the drivetrain (6); and activating the internal combustion engine (4) so as to generate a torque ($T_E$) between the first instant ($t_1$) and a fourth instant ($t_4$), which is prior to the third instant ($t_3$);

wherein the longitudinal deceleration ($\alpha$) of the road vehicle (1) is zero in the second instant ($t_2$).

11. A method to control the execution of a shift to a lower gear while an accelerator pedal (22) is released in a drivetrain (6) provided with a dual-clutch, servo-assisted transmission (7), so as to shift from a current gear (A) to a following gear (B), which is shorter than the current gear (A);

the drivetrain (6) comprises a dual-clutch, servo-assisted transmission (7) having two primary shafts (15); at least one secondary shaft (17) connected to drive wheels (3);

and two clutches (16A, 16B), each interposed between a drive shaft (5) of an internal combustion engine (4) and a corresponding primary shaft (15);

the control method comprises the steps of:

opening, in a first instant ($t_1$), an outgoing clutch (16A) associated with the current gear (A);

closing, in the first instant ($t_1$), an incoming clutch (16B) associated with the following gear (B);

completing the opening of the outgoing clutch (16A) in a second instant ($t_2$);

completing the closing of the incoming clutch (16A) in the second instant ($t_2$);

synchronizing, between the second instant ($t_2$) and a third instant ($t_3$), a rotation speed ($\omega_E$) of the internal combustion engine (4) with a rotation speed ($\omega_B$) of the incoming clutch (16B), namely with the rotation speed ($\omega_B$) imposed by the gear ratio of the following gear (B);

controlling the incoming clutch (16B) between the second instant ($t_2$) and the third instant ($t_3$) so as to have the incoming clutch (16B) temporarily transmit a greater torque ($T_B$) than the torque that the clutch (16B) is going to transmit immediately after the shift to a lower gear and than the torque ($T_A$) that the outgoing clutch (16A) transmitted immediately before the shift to a lower gear in order to accelerate the internal combustion engine (4) using the kinetic energy owned by a road vehicle (1) provided with the drivetrain (6); and activating the internal combustion engine (4) so as to generate a torque ($T_E$) between the first instant ($t_1$) and a fourth instant ($t_4$), which is prior to the third instant ($t_3$);

wherein in the second instant ($t_2$) the road vehicle (1) has a positive longitudinal acceleration ($\alpha$).

\* \* \* \* \*